Dec. 9, 1958　　T. B. TAYLOR ET AL　　2,863,964
AUTOMATIC CIRCUIT BREAKERS
Filed June 9, 1953　　　　　　　　　　　　　　3 Sheets-Sheet 1
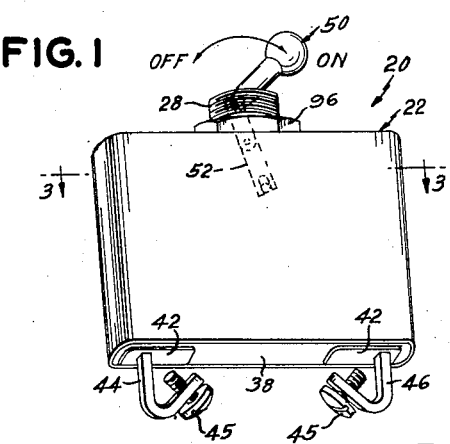
FIG. I
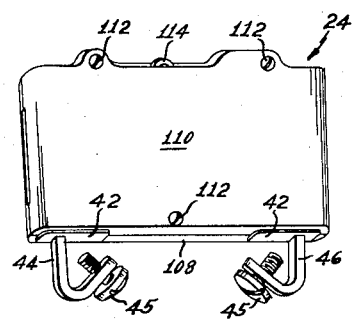
FIG. 2
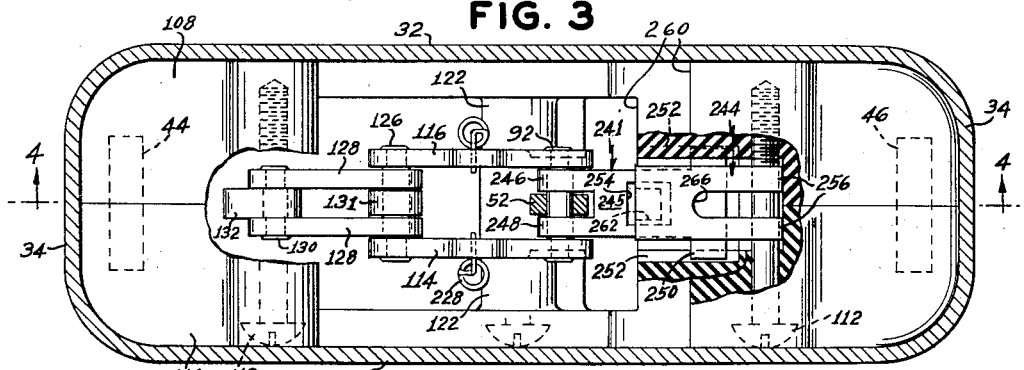
FIG. 3
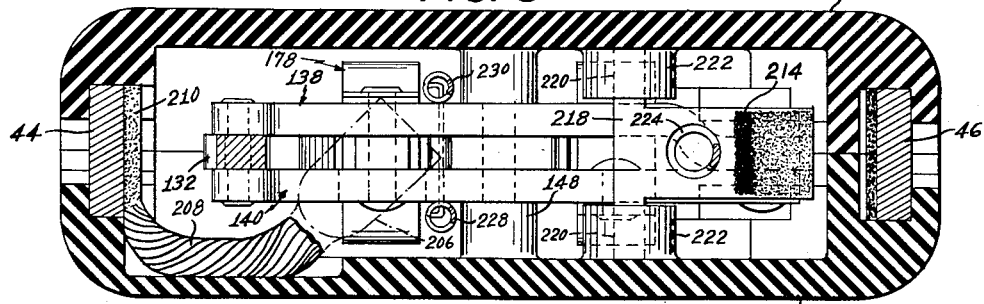
FIG. 5
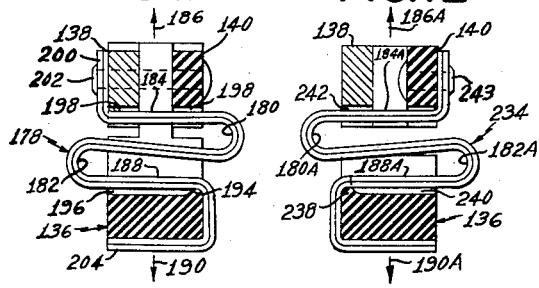
FIG. 11　　FIG. 12
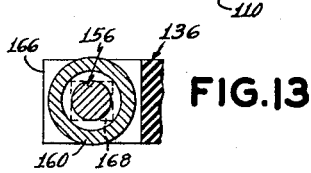
FIG. 13
INVENTORS
Tracy B. Taylor
Gustav A. Duve
BY Edwin Dunsol +
Harry Cole
ATTORNEYS Dec. 9, 1958 T. B. TAYLOR ET AL 2,863,964
AUTOMATIC CIRCUIT BREAKERS
Filed June 9, 1953 3 Sheets-Sheet 2

INVENTORS
Tracy B. Taylor
Gustav A. Duve
BY
ATTORNEYS

Dec. 9, 1958  T. B. TAYLOR ET AL  2,863,964
AUTOMATIC CIRCUIT BREAKERS
Filed June 9, 1953  3 Sheets-Sheet 3
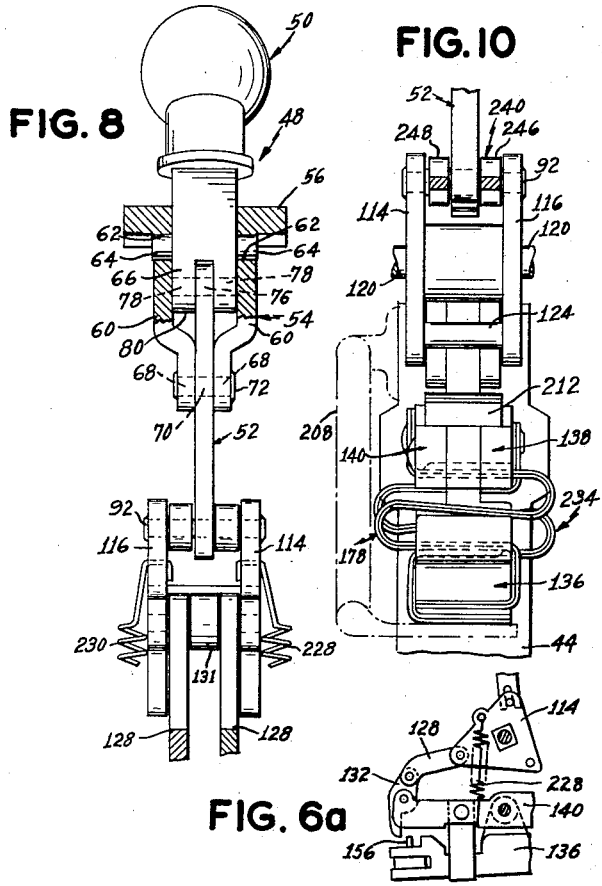
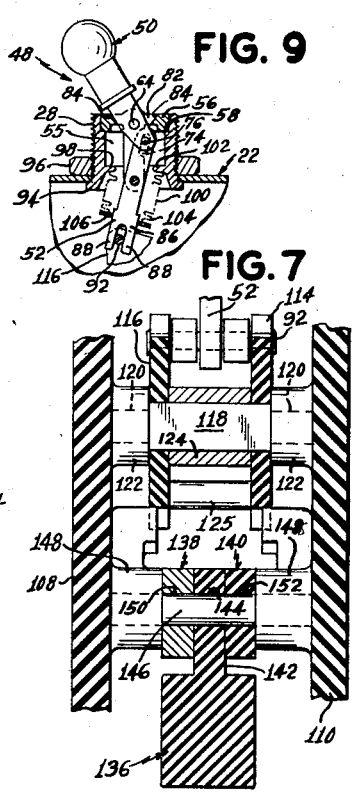
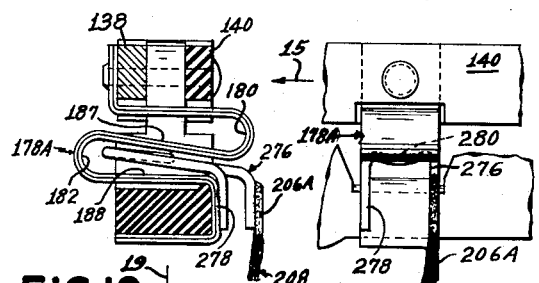
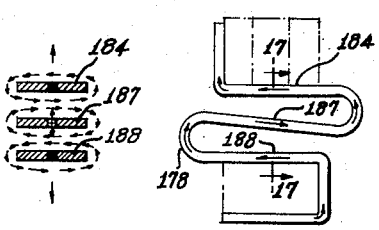
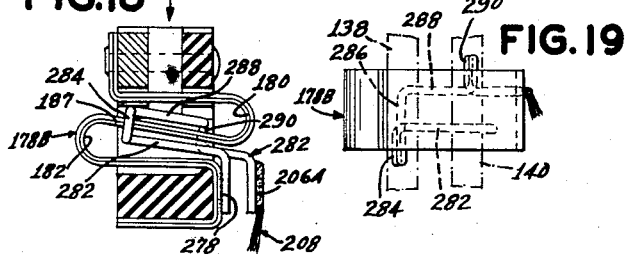
INVENTORS
Tracy B. Taylor
Gustav A. Dupe
BY
ATTORNEYS

2,863,964

AUTOMATIC CIRCUIT BREAKERS

Tracy B. Taylor, South Orange, and Gustav A. Duve, Hackettstown, N. J., assignors to Federal Electric Products Company, Newark, N. J., a corporation of Delaware Application June 9, 1953, Serial No. 360,522

27 Claims. (Cl. 200—88)

The present invention relates in general to circuit breakers, and, in particular, to an automatic circuit breaker having a thermally responsive control device and which is provided with means to automatically compensate for variation in ambient temperature and with means to neutralize or compensate for sudden and severe shocks, or vibrations, to which the circuit breaker may be subjected.

The primary object of the present invention is the provision of an improved circuit breaker of the foregoing type which will be highly resistant to sudden shocks or vibrations.

Another object is to provide a highly novel and efficient automatic ambient temperature compensation arrangement for a circuit breaker.

Another object is to provide a circuit breaker of the foregoing type with automatical temperature compensation and also to compensate or neutralize mechanical shocks and vibrations so that the breaker will be practically unaffected by such shocks or vibrations.

Another object is the provision of an ambient temperature compensation construction which itself incorporates a shock resisting feature.

Another object is the provision of a balanced mounting for the latching mechanism and both current-responsive and compensating bimetals which prevents the unlatching of said mechanism in response to mechanical shocks.

Another object is the provision of highly novel inertia latch to prevent the operation of the circuit breaker in the case of severe shocks.

Another object is the provision of a bimetallic control device which provides for a magnetic tripping action on heavier overloads and on severe short circuits.

A further object is the provision for confining and directing the heat generated in the bimetal heater to insure proper bimetallic deflection in circuit breakers having low current ratings.

A still further object is the provision of a normally stationary contact which has provision to take up shock, to provide for desired contact pressure and to provide for a contact wiping action.

The above and other objects, features and advantages of the present invention will be more fully understood from the following description considered in connection with the accompanying illustrative drawings.

In the drawings which illustrate the best mode now contemplated by us for carrying out our invention;

Fig. 1 is a perspective view of a circuit breaker pursuant to the present invention;

Fig. 2 is a perspective view of the circuit breaker, removed from its outer protective casing and with the operating handle removed;

Fig. 3 is a sectional view, on an enlarged scale, taken on the line 3—3 of Fig. 1, with parts broken away for purposes of illustration;

Fig. 5 is a sectional view taken on the line 5—5 of Fig. 4;

Fig. 6A is a fragmentary view similar to Figs. 4 and 6, and illustrates a position intermediate that shown in said figures through which the circuit breaker mechanism passes upon the tripping thereof;

Fig. 7 is a fragmentary sectional view taken on the line 7—7 of Fig. 4;

Fig. 8 is a view in elevation of the handle or manual operating assembly, as seen in the direction of the line 8—8 in Fig. 4;

Fig. 9 is a fragmentary sectional view, on a reduced scale, and illustrates the handle assembly in the "off" position thereof;

Fig. 10 is a sectional view taken on the line 10—10 of Fig. 4, the outer protective casing and the housing for the circuit breaker mechanism being omitted;

Figure 4:
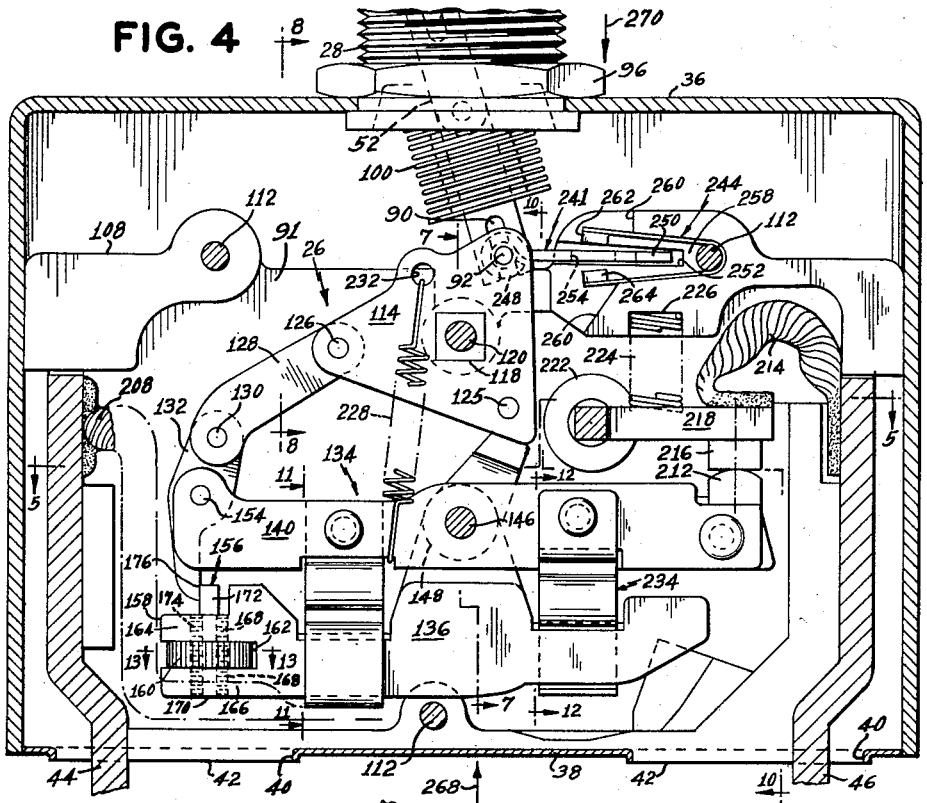
Fig. 4 is a sectional view taken on the line 4—4 of Fig. 3, the circuit breaker being illustrated in the closed or circuit-making condition thereof.

Figs. 11, 12, and 13 are sectional views taken on the lines 11, 12 and 13 respectively of Fig. 4;

Fig. 14 is a view similar to Fig. 11 and illustrates a modification in the current-responsive bimetal assembly;

Fig. 15 is a fragmentary view taken in the direction of the arrow 15 in Fig. 14;

Figs. 16 and 17 schematically illustrate the magnetic trip-action of the current responsive bimetal;

Fig. 18 is a view similar to Fig. 14 and illustrates another modification in the current-responsive bimetal assembly; and Fig. 19 is a view in the direction of the arrow 19 in Fig. 18.

Figure 6:
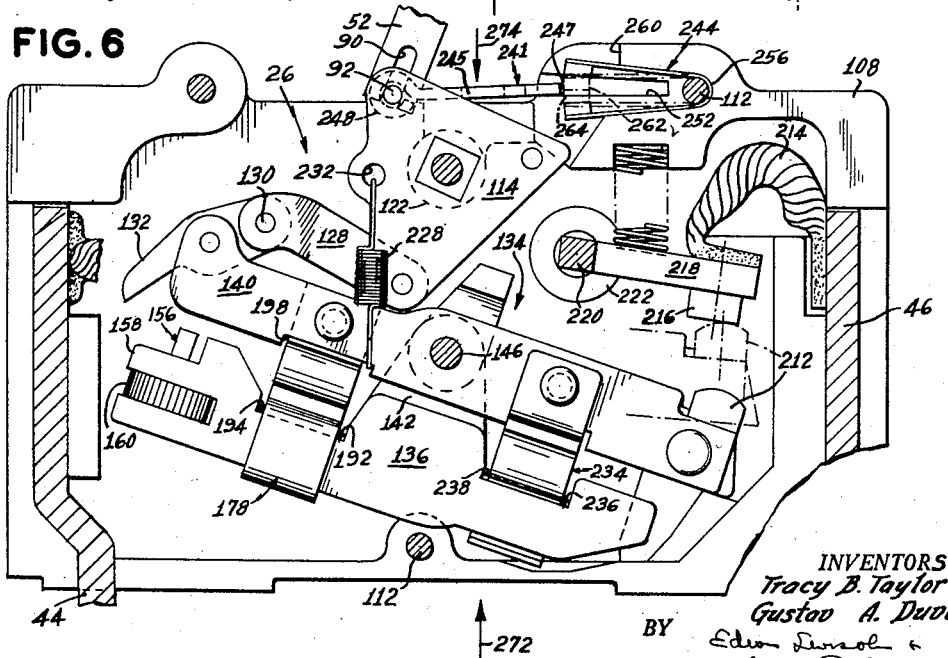
Fig. 6 is a view similar to Fig. 4, the circuit breaker being illustrated in the open or circuit interrupted condition thereof.

Referring now to the drawings in detail, the circuit breaker 20 of the present invention is provided with a preferably metallic outer protective casing 22 in which there is disposed the insulated housing 24 which contains the circuit breaker mechanism, generally indicated by the reference numeral 26 in Figs. 4 and 6.

The casing 22, hermetically seals the circuit breaker mechanism therein, and, as here shown, the casing is a rigid metallic member having a projecting neck 28, front and rear walls 30 and 32 respectively, side walls 34, a top wall 36 and a bottom plate 38. Said plate is apertured as at 40—40 and receives in said apertures the depending bottom wall portions 42—42, respectively of the housing 24. The terminal members 44 and 46 of the circuit breaker extend through the bottom wall portions 42 of the housing and through the apertures of the metallic casing, the projecting portions of said terminals being provided with terminal screws 45. It will be understood that a suitable sealing compound is used at the portions of the casing and housing through which the terminals extend for hermetically sealing the casing at these points.

Manually operable actuator mechanism 48 (Figs. 8 and 9) for operating the circuit breaker mechanism 26 to open and close the latter is provided in the previously mentioned throat portion 28 of the outer casing 22. Said mechanism is of the type illustrated and claimed in the copending application of Tracy B. Taylor, a joint inventor hereof, Serial No. 270,297, filed February 7, 1952, and assigned to the assignee hereof. More specifically, said actuator mechanism comprises a handle 50, a lever 52 and a support element 54 which are positioned relative to the casing 22 in a manner to be described in detail hereinafter. The neck portion 28 has an aperture 55 extending therethrough and the operating handle 50 extends externally of the casing 22 into the neck portion 28. Positioned in the neck portion is a support element 54 which has a cylindrical portion 56. As best shown in Fig. 9, the neck portion 28 is adapted to receive the cylindrical portion 56 of element 54 in tightly secured relation and for this purpose the neck portion is provided with an annular groove 58 in which is secured said portion 56 of element 54. The support element 54 is also provided with a pair of spaced projecting legs 60—60 which are adapted to pivotally mount the lever 52. Said legs are apertured, as at 62—62, for pivotally mounting the projections 64—64 provided on the manual operating member 50 whereby to pivotally mount said manual operating member. It will be noted that, when so mounted, the lower portion 66 of the manual operating member 50 is disposed between the legs 60—60 of the support member 54. The lever 52 is also pivotally mounted to the legs 60—60 and for this purpose said legs are apertured at the lower portion thereof with the apertures aligned as at 68—68. The lever 52 is apertured at an intermediate portion thereof, as at 70, and a pivot pin 72 is received in the apertures 68—68 of the legs 60—60, respectively, and aperture 70 of the lever, to pivotally mount the latter to the support element 54. The upper end of the lever is provided with an elongated slot 74 which is adapted to receive a pin 76 when the latter is positioned in the aligned apertures 78 at the forked end 80 of the operating handle 50. Thus the lever 52 is floatingly pivotally mounted to the forked end 80 of the operating handle 50 by means of the pin 76 which is received in the aligned apertures 78 of the operating handle and the elongated slot 74 at the upper end of the lever, as best illustrated in Fig. 9.

The cylindrical portion 56 of the support element 54 is apertured at 82 and the opposite internal faces 84 of said cylindrical portion are mutually inclined to provide abutments for adjacent portions of the operating handle 50. The operating handle 50 is adapted to be manually pivoted between the extreme positions thereof shown in Figs. 1 and 9 respectively, and the inclined faces 84 of said cylindrical portion 56 provide stops or abutments for the operating handle at said extreme positions. It will be readily apparent from the above that the pivotal movement of the operating handle will be effective to correspondingly move the lower end 86 of lever 52 in the same direction due to the pivotal connections above described.

The lever 52 has its end portion 86 forked to provide a pair of spaced legs 88 defining an opening 90 therebetween. The lever 52 is operatively associated with the shaft 92 of the circuit breaker mechanism 26 by positioning said shaft in the opening 90 between the spaced legs 88. With the lever 52 operatively associated with the circuit breaker mechanism 26 in this manner, the movement of the handle 50 will be effective to correspondingly move the operating mechanism of the circuit breaker, as hereinafter described in detail.

As here shown, the neck portion 28 of the casing 22 is provided with a flange 94 which underlies the upper wall 36 and is secured thereto in any suitable manner. The neck portion is externally threaded and is provided with a nut 96. Said threaded portion and the nut serve for mounting the circuit breaker in position on a suitable support. The neck portion is also provided with an integral annular shoulder 98, internally thereof, which is adapted for a purpose to be described.

In order to hermetically seal the circuit breaker mechanism 26 within the casing, and as illustrated and described in said copending application there is provided sealing means comprising a flexible resilient tubular member 100 of bellows-like construction having one peripheral end portion 102 secured to the lower face of said annular shoulder 98 in any suitable manner. The opposite peripheral end portion 104 of said tubular member is secured to a circular plate 106 which is centrally apertured and the lever 52 extends through the aperture in said plate and is secured thereto in sealing relation in any conventional manner. Similarly, it will be understood that the peripheral end portion 102 of the tubular member is secured to the annular shoulder 98 in sealing relation therewith and similarly the plate 106 is secured to the peripheral end portion 104 of the member 100 and the adjacent portions of the lever 52 in sealing relation whereby the circuit breaker mechanism 26 is hermetically sealed within the casing 22. As previously indicated, the hermetic sealing of the circuit breaker mechanism within the outer casing 22 is also effected at the points where the terminal members 44 and 46 respectively pass through the bottom wall of the casing. Due to said hermetic sealing, if desired the circuit breaker may be filled with oil or a suitable inert gas, such as, for example and not by way of limitation hydrogen or nitrogen, or it may be evacuated.

The flexible tubular member 100 may be of any desired configuration and in the preferred embodiment said member comprises a length of seamless corrugated flexible tubing of the open-pitched type which may be flexed through a large number of cycles without materially effecting or rupturing the tube.

In the actuation of the manual operating member 50, the movement of the latter will be effective to correspondingly move the tubular member 100 but the latter will have its walls flexed a relatively small amount due to its inherent structural characteristics. In the movement of the operating handle, the tubular member will be moved a relatively small amount by reason of the manner of pivotal connection of the lever to the handle and said member will have no material effect on the normal operation of the handle and its associated mechanism linking said handle with shaft 92 associated with the circuit breaker mechanism 26.

As previously indicated, the circuit breaker mechanism 26 is contained within the previously mentioned housing 24, formed of the companion housing parts 108 and 110 which are preferably molded from a suitable insulation material, and which are mutually secured in housing defining relation, as by the securing elements 112. Said housing is provided with an opening 91 in the upper end thereof, between said housing parts, so that the lever 52 may be operatively connected with the pin member 92, as previously described. Referring now to Figs. 4, 6, 7 and 10, it will be noted that the pin member 92 extends between a pair of spaced substantially triangularly shaped and insulated yoke members 114 and 116. Said yoke members are mounted upon the substantially square shaft member 118 and the latter is provided with the circular pivot portions 120—120 which extend from each end thereof. The companion housing members 108 and 110 are provided with circular bearing portions 122 in which the pins 120 are received. The shaft 118 is provided with a preferably circular sleeve 124 which serves to space the yoke members 114 and 116. From the foregoing it will be apparent that the previously described actuation of the lever 52 by the manual operating member 50, will result in the pivotal movement of the yoke members to and from the positions thereof illustrated in Figs. 4 and 6 due to the operative connection between the lever 52 and the pin 92 carried by said yoke members. It will be noted that the pin 92 interconnects the triangular yoke members at one of the corners thereof, a second corner of said yoke members being inter-connected by the pin 125 and the third corner being inter-connected by the pivot member 126. Said member 126 pivotally mounts the spaced links 128—128 which are separated by the spacing element 131 also mounted on a part of the pivot member 126. At the other end thereof the links 128 carry the pin member 130 which pivotally mounts the actuating lever 132 of the circuit breaker mechanism 26.

The actuating lever 132 is bodily carried by a movable switch assembly 134 of the circuit breaker mechanism. Pursuant to the present invention, the movable switch assembly 134 comprises the movable switch member 136 which is preferably formed of insulating material, the conducting arm 138 and the companion arm 140 which is formed of insulating material. In order to mount the movable switch member 136 for pivotal movement thereof, the latter is provided, intermediate the ends thereof, with the upwardly projecting pivot portion 142 which is apertured as at 144 to receive a pivot member 146 which is pivotally mounted in the bearing portions 148—148 provided on the companion housing members 108 and 110, respectfully. As best illustrated in Fig. 7, the conducting arm 138 and the companion insulated arm 140 straddle the pivot portion 142 and said arms are each suitably apertured as at 150 and 152, respectively, and the pivot member 146 extends through the openings in said arms for pivotally mounting the latter. In order to mount the actuating lever 132 for bodily movement by said companion arms of the switch assembly, the latter are provided at one end thereof with a pivot pin 154 which pivotally mounts the actuating lever substantially centrally thereof.

In order to releasably latch the actuating lever 132 to the movable switch member assembly, the movable switch member 136 is provided with the latch element or catch 156. More specifically, it will be noted that the switch member 136 is forked at one end thereof, as at 158, and a knurled adjusting nut 160 is disposed within the slot 162 between the forked fingers 164 and 166 of the movable switch member. Said fingers are provided with the vertically aligned apertures 168—168, respectively, in which the latch element 156 is disposed. It will be understood that the apertures 168—168 are substantially square openings, as illustrated in Fig. 13, in which the latching member 156 has a sliding fit, and in order to prevent rotation of said latching member in said square openings, the latching member is provided with a square end as at 170. At its other end thereof, the latching element 156 is provided with a substantially rectangular latching portion or catch part 172 and intermediate the ends thereof, the latching member 156 is provided with a circular threaded portion 174 which is in threaded engagement with the adjusting nut 160. It will be noted that the actuating lever 132 has a free end part 176 for latching engagement with the latching portion 172 of the latching member 156. From the foregoing, it will be understood that rotation of the adjusting nut 160 results in axial movement of the latching member 156 and in this manner it is possible to adjust the extent of overlap of the latching portion 172 relative to the free end part 176 of the actuating lever for calibrating the circuit breaker mechanism.

The current control device for the circuit breaker mechanism is constituted by the bimetallic member 178. Pursuant to the present invention, the bimetal 178 is formed into the oppositely directed loops 180 and 182 (Fig. 11). It will be understood that when the bimetal 178 is subjected to sufficient heat to cause it to flex, the arm 184 of the loop 180 will move in the direction of the arrow 186 and the arm 188 of the loop 182 will move in the opposite direction as indicated by the arrow 190. In order to provide for such action of the bimetallic member 178, it will be understood that the latter is reverse welded so that the high expansion metal is on the inner surface of the arm 184 in the loop 180 and the high expansion metal is also on the inner surface of the arm 188 in loop 182. In order to mount the bimetallic element 178 in position, the movable switch member 136 is provided at one side of its pivot with a recessed porton 192 which forms a seat for the bimetal, the latter straddling said switch member at the seat, as best illustrated in Fig. 11. It will be noted that the switch member is provided at said seat, at one edge thereof, with the raised portion or head 194 which provides for the clearance 196 to allow for the flexing action of the loop portion 188. The companion arms 138 and 140 are recessed, as at 198, to provide for a clearance for the arm 184 of the loop 180 and the end portion 200 of the bimetal 178 is secured to the conducting bar 138 in conducting relation therewith, as by the securing element 202. The other end 204 of the bimetal is electrically connected to the end 206 (Fig. 5) of a flexible conductor 208, the other end of which is suitably secured, as at 210, to the upper end of the previously referred to terminal member 44. At the end thereof opposite the actuating lever 132, the conducting arm 138 is provided with a movable contact 212. To complete the circuit through the breaker, the companion previously mentioned terminal member 46 is connected by means of a flexible conductor 214 to a normally stationary contact 216 which is engaged by said movable contact.

Pursuant to an important feature of the present invention, the normally stationary contact 216 is mounted for floating movement. More specifically, the the contact 216 is provided at one end of a rigid terminal bar 218, the other end of which is provided with the laterally extending pivot portions 220—220 which are secured in companion bearing portions 222—222 provided on the housing parts 108 and 110, respectively. It will be readily apparent that the normally stationary contact 216 is mounted for limited arcuate movement about a transverse axis which extends between the bearing portions 222—222. A compression spring 224, having one end thereof seated in the housing, as at 226, and the other end thereof in engagement with the terminal element 218, normally biases the stationary contact in a clockwise direction, viewing Figs. 4 and 6. Referring now to Fig. 4, it will be readily apparent that the spring 224 serves to bias the normally stationary contact 216 against the movable contact 212 to provide for desired contact pressure in the closed condition of the circuit breaker. In addition, it will be noted that the movable contact 212 has a spherical contacting surface which engages the planar contacting surface of the companion stationary contact 216. This permits for a wiping action of said contacts upon the closing of the circuit breaker mechanism. The rigid solid normally stationary contact being pivotally movable, and being biased by the spring member 224 for arcuate movement in toward the center of the circuit breaker, and the movable contact 212 moving from the full-line position thereof illustrated in Fig. 6 to the position thereof illustrated in Fig. 4, along an arcuate path outwardly of the center of the circuit breaker, it will be apparent that the opposing contact faces are, in effect, moving in opposite directions when they engage so as to provide for a wiping action which occurs both upon the closing and upon the opening of the circuit breaker mechanism. This will be apparent from a comparison of the relative engaged dispositions of the opposing contact faces in Fig. 6, wherein the movable contact is indicated in broken line at the start of the wiping action upon closing of the breaker, and in Fig. 4 which shows the contacts at the completion of the wiping action. Upon opening of the breaker, Fig. 4 illustrates the relative positions at the start of the wiping action and Fig. 6, in broken line, at the termination of the wiping action. In addition to the compression spring 224, provision is made for the companion tension springs 228 and 230. It will be noted from Figs. 4 and 6 that the spring 228 has one end thereof connected to the yoke 114, as at 232, and the other end thereof is connected to the insulation arm 140. It will be understood that the companion tension spring 230 is similarly interconnected between the yoke 114 and the conducting arm 138.

Referring now to Figs. 4 and 6, it will be apparent that the movement of the operating handle from the "off" to the "on" position thereof will result in the pivotal movement of the link 52 from the position thereof illustrated in Fig. 6 to the position thereof illustrated in Fig. 4, for movement of the shaft 92 as illustrated in said figures. Said movement of the shaft 92 results in the clockwise rotation of the companion yokes to the position thereof illustrated in Fig. 4. During said movement of the yokes, the companion links 128—128 move the free end 176 of the actuating lever 132 into engagement with the companion latch 156 and the continued movement of the operating handle in the same direction, after said engagement of the latch 156, results in the pivotal movement of the movable switch member assembly 134 to the closed condition thereof, as illustrated in Fig. 4, wherein the companion contacts are in engagement. This completes the circuit between the terminals 44 and 46. Upon the occurrence of an overload or other abnormal current condition, it will be understood that the bimetallic control element 178 will flex so that the arms 184 and 188 thereof will move in opposite directions i. e., away from each other (Fig. 16), whereby to cause relative pivotal movement of the movable switch member 136 and the companion arms 138 and 140. This results in the disengagement of the latch 156 from the actuating lever 132 and the movement of the movable switch assembly to the open position thereof, by the contraction of the springs 228, for separating the companion contacts. In this connection, it will be understood that in the closed condition of the circuit breaker mechanism, there is a normally overset toggle constituted by the yokes 114 and 116, which form one arm of the toggle, and the links 128—128 which form the other arm of the toggle. It will be noted that the intermediate toggle axis, at 126, is above a line extending between the outer toggle axes, 120 and 130, in the closed condition of the circuit breaker (viewing Fig. 4). Furthermore, it will be noted that the companion tension springs 228 are stressed in said closed condition of the circuit breaker. In response to the described flexing of the bimetallic control element 178 upon overload, the movable switch member 136 pivots in a counterclockwise direction, as illustrated in Fig. 6A, so that the latch 156 releases the lever 132. The tensioned springs 228 now cause the yokes 114 and 116 to rotate from their positions thereof illustrated in Fig. 4 to their positions illustrated in Fig. 6. During said movement of the yokes, the intermediate toggle axis 126 moves downwardly through the line extending between the outer axes 120 and 130, the lever 132 pivoting in a counterclockwise direction, as illustrated in Fig. 6A, to permit said movement of the toggle axis 126. When said axis 126 passes below said line, the lever 132 pivots in a clockwise direction to the position thereof illustrated in Fig. 6, wherein the toggle is shown in its collapsed position. Therefore, upon disengagement of the latch from the actuating lever, the springs 228 are effective to cause the collapse of the toggle and the pivotal movement of the movable switch assembly to the open position thereof. The springs are also effective to rotate the companion yokes to the position thereof illustrated in Fig. 6 resulting in the movement of the shaft member 92 in a direction to move the lever 52 and thereby automatically move the handle to the "off" position thereof. The circuit breaker can be manually operated to "off" position by movement of the handle to "off" position whereby to rotate the yokes 114—116 to the position thereof illustrated in Fig. 6, to collapse the toggle and permit the springs 228 to rotate the movable switch assembly to "off" position thereof.

In order to provide for ambient temperature compensation, provision is made pursuant to another feature of the present invention, for a second bimetallic element 234, as best illustrated in Fig. 12. It will be understood that the bimetallic element 234 is similar in construction and in operation to the previously described bimetallic element 178, which constitutes the current control device for the circuit breaker. In order to mount said compensating bimetallic element, the movable switch member 136 is provided with an additional seat 236 which is disposed at the other side of the pivot 146 relative to the seat 192 for the current control bimetal 178. The member 136 is provided with a projecting portion or bead 238 along one side edge thereof at said seat to provide a clearance 240 for the bimetal 234, as previously described in connection with the bimetal 178. In the same manner the arms 138 and 140 respectively, are provided with the clearance portions 242—242. From the foregoing, it will be apparent that when the compensating bimetal 234, is subjected to sufficient heat to cause the latter to flex, the arm 184A in the loop 182A will flex in the direction of the arrow 186A and the arm 188A in the loop 182A will flex in the direction of the arrow 190A. Moreover, it will be noted that the compensating bimetal 234 is connected to the insulated arm 140, as at 243, and therefore it will be readily apparent that said compensating bimetal is not in the current flow circuit of the circuit breaker.

It will be noted that the control bimetal 178 and the compensating bimetal 234 are disposed at opposite sides of the pivot 146, substantially at the same distance therefrom. The ambient temperature will effect both of said bimetals in the same manner. Therefore, it will be readily apparent that when the ambient temperature tends to deflect the current control bimetal for the companion arms 138 and 140 to pivot as a unit relative to the switch member 136, in a direction to effect separation of the latch 156 from the actuating lever 176, the compensating bimetal will be affected in the same manner and to the same extent, so as to tend to deflect at the other side of the common pivot for effecting relative pivotal movement of said arms and said movable switch member in the opposite direction. Consequently, the forces or stresses existing between the switch member 136 and both switch arms, as a unit, at the opposite sides of the common pivot, will tend to cancel out in view of the fact that they are in opposite directions and substantially of the same magnitude, whereby to prevent the disengagement of the latch and the actuating lever so as to retain the breaker in the closed condition thereof.

Pursuant to another feature of the present invention, the circuit breaker is compensated for severe shocks or other mechanical vibrations. As previously indicated, the spring follower action of the spring 224 on the stationary contact 216, aids in the compensation for mechanical shock by taking up shock which is in the direction of the arrow 268 in Fig. 4, or upwardly of the circuit breaker, so as to prevent the disengagement of the contacts. In addition, compensation for, or neutralization of, mechanical shock is also achieved as a result of the centrally disposed pivot 146 of the movable switch member assembly, and the balanced arrangement of the two bimetals, so that there is a bimetal at either side of said pivot and substantially at the same distance therefrom, to provide a balance of weights which, in turn, provides a balanced mounting for the movable switch assembly so that when the circuit breaker is subjected to severe mechanical shocks or vibrations, the forces acting on both sides of the pivot 146 will be balanced and, consequently, will prevent the disengagement of the latch 172 and the actuating lever 132, as a result of shock or vibration. In this connection, it will be understood that the shock forces acting upon said movable switch member assembly, at opposite sides of its pivot, will tend to compensate each other so that they will balance out.

It will be apparent that when the circuit breaker of the present invention is used in connection with military or naval installations, or in connection with commercial installations such as various types of vehicles and airplanes, said circuit breaker is likely to be subjected to sudden and severe shocks. As previously indicated, while the latching mechanism, which is associated with the movable switch assembly, will not be affected by said shocks, due to the balanced mounting of the movable switch member assembly, and while the closed contacts will not open in response to said shock due to the floating mounting of the stationary contact, it is necessary to make additional provision to compensate for shocks directed either at the bottom wall, as at arrow 268 or the top wall, as at arrow 270, of the casing 22, in order to prevent the operation of the handle 50 and its associated parts, including the companion yokes, which, as previously indicated, form part of a toggle arrangement with the links 128. In this connection, it will be understood that in the event of said shocks, namely from either the top or the bottom of the circuit breaker casing, said parts are not in balance because of a greater weight at the pivot 126. Consequently, with the circuit breaker mechanism in the closed condition thereof, said shocks will tend to move the pivot pin 92 toward the position thereof illustrated in Fig. 6 for opening the circuit breaker mechanism. With the circuit breaker mechanism in the open condition thereof, as illustrated in Fig. 6, said shocks will tend to move the pivot pin 92 in the opposite direction for closing the circuit breaker mechanism. Therefore, in order to compensate for said shocks, in a direction either from the top or the bottom of the circuit breaker in both the open and closed circuit condition, provision is made for an inertia latch assembly 241. Said assembly is constituted by the inertia latch piece 245 and the inertia latch spring 244. The latch piece 245 is preferably formed of a suitable metal and is forked at one end thereof to provide the companion legs 246 and 248 which are looped about the pivot pin 92, as best illustrated in Figs. 4, 6 and 10. The forked end 86 of the lever 52, engages the pin 92 between said legs 246 and 248. At the other end thereof, the latch member 245 is provided with the laterally extending arms 250—250 which are mounted for reciprocation in cooperating guideways 252—252 defined in the insulated housing 24. Intermediate the ends thereof, the latch piece 245 is provided with a substantially square aperture 254. The inertia spring 244 is a substantially flat spring member which is looped or bent between the ends thereof, as at 256, and the looped portion is mounted on an upper housing-securing element 112. In order to retain the latch spring in the operative disposition thereof illustrated in Fig. 4, the housing is provided with a recessed portion 258 which forms a seat for the spring latch. The outer end of the seat is indicated at 260 and it will be noted that the ends of the spring are disposed outwardly of the seat. At said ends thereof, the spring is provided with the upper catch or weight 262 and with the lower catch or weight 264 which are dimensioned to enter the square aperture 254 in the latch piece. The spring is also provided with a closed slot 266 which extends from a point rearwardly of the upper catch 262 and runs through the looped portion 256 thereof to terminate rearwardly of the lower catch 264. In the closed condition of the breaker, the catches 262 and 264 are in registry with the aperture 254, straddling the latter, as in Fig. 4, and in the open condition, said catches are disposed immediately behind the end 247 of the latch piece, as in Fig. 6.

Assuming now that the circuit breaker is in the closed condition thereof, as illustrated in Fig. 4, and is subjected to a blow or a shock in the direction of the arrow 268, the tendency of the various parts is to move upwardly in the casing, and consequently, the upper catch 262 will engage in the square aperture 254 to prevent the counter-clockwise rotation of the yokes about their axis 120 due to the shock forces acting upon the manually operable actuating mechanism and thereby prevent the collapse of the toggle and the consequent opening of the circuit breaker mechanism. In the same manner, in the event of a shock or a blow in the direction of the arrow 270, in the closed condition of the circuit breaker, the lower catch 264 will be engaged in the square aperture 254 of the latch piece to prevent the collapse of the toggle and the consequent opening of the circuit breaker.

Assuming now that the circuit breaker mechanism is in the open condition thereof, as illustrated in Fig. 6, it will be noted that the latch piece 245, which in the closed condition of the circuit breaker had been disposed between the opposing arms of the spring 244 so that the opposed catches of the latter were in alignment with the aperture of the latch member, is now disposed laterally outwardly of the free ends of the latch spring. Assuming now that there is a blow or a shock in the direction of the arrow 272 in Fig. 6, the tendency of the yokes will be to rotate in the clockwise direction so that the latch member will tend to return to the position thereof illustrated in Fig. 4. However, in the event of such an occurrence, the upper spring catch 262 moves into position behind the free end 247, or forwardly of the free end of the latch member, as indicated in broken line in Fig. 6 to prevent the movement of the latch member between the spring arms, whereby to prevent the closing of the breaker. Similarly, in the event of a shock or blow in the direction of the arrow 274, the lower catch is momentarily disposed as indicated in broken line in Fig. 6, to prevent the movement of the latch member to its closed circuit condition and thereby to prevent the closing of the circuit breaker mechanism. Therefore, it will be readily apparent that the circuit breaker of the present invention is compensated for shock as follows: at the switch member latching mechanism thereof by the previously described balanced mounting of the movable switch member assembly, at the companion contacts by the floating mounting of the normally stationary contact, and at the manual operating mechanism by the inertia latch assembly. In order to vary or adjust the operation of the inertia latch assembly to respond to shocks of different magnitudes, respectively, the thickness of the spring 244 and/or the weight of the catches 262 and 264 can be changed.

While the foregoing shock compensation, compensates for shock directed either toward the top or the bottom of the circuit breaker, it is unnecessary to compensate for shock which may be directed toward either end of the circuit breaker. In this connection, it will be understood that in the present construction, there is a balance of weights at the toggle axis 126 relative to the toggle axis 120 and consequently the toggle will not operate in response to shocks directed at either end of the circuit breaker. However, in the event that the parts are not in balance for said lateral shock at either end of the circuit breaker mechanism, it is necessary only to insert an additional inertia latch assembly, such as the assembly 241, which would be disposed in a vertical plane and would operate in said vertical plane in substantially the same manner that the illustrated inertia latch assembly operates in a horizontal plane. Consequently, this would eliminate or compensate for shocks directed at either end of the circuit breaker mechanism in the event of an unbalance of the parts for lateral shock.

As previously indicated, current responsive bimetal 178 flexes upon the heating thereof upon the occurrence of an overload to trip the circuit breaker mechanism. This thermal action of the bimetal occurs when the predetermined current time rating of the control device is exceeded. However, pursuant to another feature of the present invention, the control device, on heavy overloads provides a magnetic action which cooperates with the thermal action thereof to effect the tripping of the circuit breaker mechanism, which magnetic action, on severe short circuits, provides for a magnetic deflection of the control device to trip the circuit breaker instantaneously. Referring now to Figs. 16 and 17, current flow through the current control bimetal 178 is indicated by the various arrows. The direction of current flow in the outer arms 184 and 188 are in the same direction. However, the direction of current flow through the common arm 187 of both loops is opposite to that in each of said outer arms 184 and 188. Referring now to Fig. 17, wherein the current flow through the outer arms 184 and 188 is represented as in a direction outwardly of the drawing, the current flow through the intermediate arm 187 being represented as in a direction into the drawing, it will be apparent that magnetic fields will be generated about the arms 184 and 188 which fields are of the same polarity, whereas the magnetic field about the intermediate arm 187 will be of opposite polarity to that about said outer arms. The magnetic attraction between said intermediate arm 187 and one of the outer arms will be offset by the magnetic attraction between said intermediate arm and the other of said outer arms, whereby said intermediate arm will remain substantially stationary. However, the interaction of the magnetic fields of the same polarity about both of said outer arms, will result in the mutual repulsion of said outer arms whereby the current control bimetal will flex in the same manner as upon the flexing thereof in response to thermal action, whereby to effect the mutual pivotal movement of the movable switch member 136 relative to the companion bars 138 and 140, as a unit, to effect the separation of the latch 172 and the actuating lever 132 for tripping the circuit breaker mechanism. Consequently, it will be apparent that upon heavier overloads said magnetic repulsion will cooperate with the thermal action of the bimetal to open the circuit breaker, and upon severe short circuits, said magnetic action of the control bimetal will effect substantially instantaneous opening of the circuit breaker.

Where it is desired to utilize the construction of the present invention for a low current-rating circuit breaker, for example and not by way of limitation, a circuit breaker which will trip substantially at two amperes, the control bimetal 178 must be made quite thin. With a bimetal which has a thickness, for example and not by way of limitation of only .007 inch, said thickness or bulk is still too great to provide for the required generation of heat in a short enough time period to satisfy the current time rating for such a low current circuit breaker. Therefore, in order to provide for the generation of the proper amount of heat to deflect the bimetal in the required time, provision is made, pursuant to the present invention, for an auxiliary heater 276, as best illustrated in Figs. 14 and 15. Where the auxiliary heater is used, the previously referred to flexible conductor 208, which has one end thereof secured to the terminal member 44, will now have the other end thereof secured to one end of the heater, as at 206A. The other end of the heater is suitably secured, as by soldering or welding, as indicated at 278, to the current control bimetal 178A, and the other end of the bimetal is electrically connected to the current conducting bar 138, as previously described. Consequently, it will be readily apparent that the auxiliary heater 276 is connected in series with the current control bimetal 178A. The heater is provided with a central looped or bent portion 280 and pursuant to the present invention, said portion is disposed directly in one of the loops of the current control bimetal. As here shown, the heater is disposed within the loop 182 so that it is in close thermal relation to the arms 187 and 188 of the bimetal whereby to direct and confine the heat thereto. Consequently, the heat added by the heater to that generated in the current control bimetal by the flow of current therethrough, will be sufficient to trip the breaker in a short enough period, in the case of a low current rating breaker to prevent damage to the bimetal upon overloads.

Referring now to Figs. 18 and 19 there is illustrated a modification of the heater pursuant to which heat can be provided in both loops of the control bimetal 178B and thereby to increase the heat available for the current control bimetal. The heater 282 has one end thereof connected to the flexible conductor 208, as at 206A, and the other end of the heater is connected to the current control bimetal 178B, as at 278, so that the heater is in series with said bimetal. From said latter end, the heater has a linear portion 282 which extends into the lower bimetal loop 182, the heater then loops, as at 284, about one marginal edge of the heater arm 187 into the upper bimetal loop 180. From its loop 284, the heater extends transversly of the bimetal loop 180, as at 286, and then longitudinally thereof, as at 288, to form the loop 290 therein which loops about the opposite marginal edge of the center arm 187 of the bimetal and back into the lower loop 182 to connect to the flexible conductor. Consequently, it will be apparent that the heater has portions thereof in each loop of the current control bimetal.

The subject matter of this application is related to the subject matter of U. S. Patent No. 2,653,202, issued to Thomas M. Cole on September 22, 1953, and assigned to the assignee hereof.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent, is:

1. In a circuit breaker having relatively movable contacts engageable with and disengageable from each other for making and breaking the circuit, movable switch means carrying one of said contacts and mechanism, including actuating means and latch means releasably engaged therewith in predetermined relation, for actuating said movable switch means to make and break the circuit; a current responsive flexible bimetallic control element operatively engaging said movable switch means and operable on said movable switch means upon the occurrence of an abnormal current condition to release said actuating means from said latch means for opening the breaker, and means operatively engaging said movable switch means and operable on said switch means in opposition to said control element for substantially preventing the flexing of said control element in response to energy variations to which said circuit breaker may be subjected, whereby to substantially neutralize the effects of said energy variations on said control element for maintaining said predetermined actuating and latch means relation substantially constant through a range of said energy variations, said energy variations being variations in mechanical energy, said movable switch means being mounted in substantially balanced disposition, said control element being disposed to operate on said movable switch means at one side of the balanced mounting thereof, and said preventing means being disposed to operate on said movable switch means at the other side of said balanced mounting with substantially the same degree of force as said control element in response to the variations in mechanical energy to which the circuit breaker is subjected.

2. In a circuit breaker having relatively movable contacts engageable with and disengageable from each other for making and breaking the circuit, movable switch means carrying one of said contacts and mechanism, including actuating means and latch means releasably engaged therewith in predetermined relation, for actuating said movable switch means to make and break the circuit; a current-responsive flexible bimetallic control element operable on said movable switch means upon the occurrence of an abnormal current condition to release said actuating means from said latch means for opening the breaker, and means for compensating for flexing of said control element in response to ambient temperature variations, said latter means comprising a compensating thermal responsive element operable on said switch means in opposition to said control element for substantially preventing the flexing of said control element in response to ambient temperature variations to which said circuit breaker may be subjected, whereby to substantially neutralize the effects of said ambient temperature variations on said control element for maintaining said predetermined actuating and latch means relation substantially constant through a range of said ambient temperature variations, said movable switch means being mounted in substantially balanced disposition, said control element being disposed to flex against said movable switch means at one side of the balanced mounting thereof, and said compensating element being disposed to flex against said movable switch means at the other side of said balanced mounting with substantially the same degree of force as said control element in response to the variations in ambient temperature to which the circuit breaker is subjected.

3. In a circuit breaker having relatively movable contacts engageable with and disengageable from each other for making and breaking the circuit, movable switch means carrying one of said contacts and mechanism, including actuating means and latch means releasably engaged therewith in predetermined relation, for actuating said movable switch means to make and break the circuit; a current-responsive flexible bimetallic control element operable on said movable switch means upon the occurrence of an abnormal current condition to release said actuating means from said latch means for opening the breaker, and means for compensating for flexing of said control element in response to ambient temperature variations, said latter means comprising a compensating thermal responsive element operable on said switch means in opposition to said control element for substantially preventing the flexing of said control element in response to ambient temperature variations to which said circuit breaker may be subjected, whereby to substantially neutralize the effects of said ambient temperature variations on said control element for maintaining said predetermined actuating and latch means relation substantially constant through a range of said ambient temperature variations, said movable switch means being mounted in substantially balanced disposition, said control element being disposed to flex against said movable switch means at one side of the balanced mounting thereof, and said compensating element being disposed to flex against said movable switch means at the other side of said balanced mounting with substantially the same degree of force as said control element in response to the variations in ambient temperature to which the circuit breaker is subjected, said actuating and latching means being provided at said one side of the balanced mounting.

4. In a circuit breaker having relatively movable contacts engageable with and disengageable from each other for making and breaking the circuit, movable switch means carrying one of said contacts and comprising first and second movable members, mechanism for actuating said switch means to make and break the circuit including actuating means provided on one of said members and latch means provided on the other of said members, said latch means being releasably engageable with said actuating means to latch said members together for concomitant movement thereof to open and close the breaker, and current-responsive control means operatively engaging said first and second movable members and operable in response to an abnormal current condition to effect relative movement of said members to disengage said actuating means and said latch means for automatic opening of the breaker, said control means being a bimetallic element, and means to compensate for flexing of said control element in response to ambient temperature variations to which said circuit breaker may be subjected comprising a compensating thermal responsive element operatively engaging said movable members and operable to oppose said relative movement of said members, whereby to substantially neutralize the effects of said ambient temperature variations on said control element, said one member being a current-conductor provided with said one contact, and said control element being in circuit therewith.

5. In a circuit breaker having relatively movable contacts engageable with and disengageable from each other for making and breaking the circuit, movable switch means carrying one of said contacts and comprising first and second movable members, mechanism for actuating said switch means to make and break the circuit including actuating means provided on one of said members and latch means provided on the other of said members, said latch means being releasably engageable with said actuating means to latch said members together for concomitant movement thereof to open and close the breaker, and current-responsive control means operatively engaging said first and second movable members and operable in response to an abnormal current condition to effect relative movement of said members to disengage said actuating means and said latch means for automatic opening of the breaker, said control means being a bimetallic element, and means to compensate for flexing of said control element in response to ambient temperature variations to which said circuit breaker may be subjected comprising a compensating thermal responsive element operatively engaging said movable members and operable to oppose said relative movement of said members, whereby to substantially neutralize the effects of said ambient temperature variations on said control element, said first and second members having a common pivotal mounting intermediate the respective ends thereof, said control element being operable at one side of said common mounting and said compensating element being operable at the other side of said common mounting.

6. In a circuit breaker having relatively movable contacts engageable with and disengageable from each other for making and breaking the circuit, movable switch means carrying one of said contacts and comprising first and second movable members, mechanism for actuating said switch means to make and break the circuit including actuating means provided on one of said members and latch means provided on the other of said members, said latch means being releasably engageable with said actuating means to latch said members together for concomitant movement thereof to open and close the breaker, and current-responsive control means operable in response to an abnormal current condition to effect relative movement of said members to disengage said actuating means and said latch means for automatic opening of the breaker, said control means being a bimetallic element, and means to compensate for flexing of said control element in response to ambient temperature variations to which said circuit breaker may be subjected comprising a compensating thermal responsive element operable to oppose said relative movement of said members, whereby to substantially neutralize the effects of said ambient temperature variations on said control element, said first and second member having a common pivotal mounting intermediate the respective ends thereof, said members each having portions at opposite sides, respectively, of said mounting and the similarly disposed portions of said members being in spaced confronting disposition, said control element operatively engaging and being operable between the spaced portions at one side of said mounting and said compensating element operatively engaging and being operable between the spaced portions at the other side of said mounting.

7. In a circuit breaker provided with a flexible bimetallic current-responsive control element which is operable in response to abnormal current conditions to open the circuit, mechanism compensated for energy variations to which the breaker may be subjected comprising movable switch means having parts mounted for relative movement, means releasably latching said parts together in predetermined relation for concomitant movement to make and break the circuit, said control element operatively engaging and being operable between said parts for releasing said latching means to free said parts for said relative movement thereof for automatic opening of the circuit, and a compensating element operatively engaging and being operable between said parts in opposition to said control element for substantially preventing the flexing of said control element in response to energy variations to which said circuit breaker may be subjected, whereby to substantially neutralize the effects of said energy variations on said control element for maintaining said predetermined latching relation substantially constant through a range of said energy variations.

8. In a circuit breaker provided with a flexible bimetallic current-responsive control element which is operable in response to abnormal current conditions to open the circuit, mechanism compensated for energy variations to which the breaker may be subjected comprising movable switch means having parts mounted for relative movement, means releasably latching said parts together in predetermined relation for concomitant movement to make and break the circuit, said control element operatively engaging said parts and being operable between said parts for releasing said latching means to free said parts for said relative movement thereof for automatic opening of the circuit, and a compensating element operatively engaging said parts and being operable between said parts in opposition to said control element for substantially preventing the flexing of said control element in response to energy variations to which said circuit breaker may be subjected, whereby to substantially neutralize the effects of said energy variations on said control element for maintaining said predetermined latching relation substantially constant through a range of said energy variations, said energy variations including variations in ambient temperature, and said compensating element being a thermal responsive element operable between said parts in opposition to said control element for substantially preventing the flexing of said control element in response to ambient temperature variations to which said circuit breaker may be subjected, whereby to substantially neutralize the effects of said ambient temperature variations on said control element for maintaining said predetermined latching relation substantially constant through a range of said ambient temperature variations.

9. In a circuit breaker provided with a flexible bimetallic current-responsive control element which is operable in response to abnormal current conditions to open the circuit, mechanism compensated for energy variations to which the breaker may be subjected comprising movable switch means having parts mounted for relative movement, means releasably latching said parts together in predetermined relation for concomitant movement to make and break the circuit, said control element being operable between said parts for releasing said latching means to free said parts for said relative movement thereof for automatic opening of the circuit, and a compensating element operable between said parts in opposition to said control element for substantially preventing the flexing of said control element in response to energy variations to which said circuit breaker may be subjected, whereby to substantially neutralize the effects of said energy variations on said control element for maintaining said predetermined latching relation substantially constant through a range of said energy variations, said energy variations including mechanical shock and said switch parts having a common mounting intermediate the ends thereof, respectively, said latching means and said control element being at one side of said common mounting and said control element operatively engaging said switch parts, and said compensating element operatively engaging said switch parts at the other side of said common mounting and operable with substantially the same degree of force as said control element in response to mechanical shock to which the circuit breaker is subjected.

10. In a circuit breaker provided with a flexible bimetallic current-responsive control element which is operable in response to abnormal current conditions to open the circuit, mechanism compensated for energy variations to which the breaker may be subjected comprising movable switch means having parts mounted for relative movement, means releasably latching said parts together in predetermined relation for concomitant movement to make and break the circuit, said control element operatively engaging said parts and being operable between said parts for releasing said latching means to free said parts for said relative movement thereof for automatic opening of the circuit, and a compensating element operable between said parts in opposition to said control element for substantially preventing the flexing of said control element in response to energy variations to which said circuit breaker may be subjected, whereby to substantially neutralize the effects of said energy variations on said control element for maintaining said predetermined latching relation substantially constant through a range of said energy variations, said energy variations including variations in ambient temperature, and said compensating element being a thermal responsive element operatively engaging said parts and being operable between said parts in opposition to said control element for substantially preventing the flexing of said control element in response to ambient temperature variations to which said circuit breaker may be subjected, whereby to substantially neutralize the effects of said ambient temperature variations on said control element for maintaining said predetermined latching relation substantially constant through a range of said ambient temperature variations, one of said parts being an insulated member and the other of said parts having a conducting member and an insulated member, and said control element being electrically connected to said conducting member.

11. In a circuit breaker provided with a flexible bimetallic current-responsive control element which is operable in response to abnormal current conditions to open the circuit, mechanism compensated for energy variations to which the breaker may be subjected comprising movable switch means formed by relatively movable elongated parts having a common pivotal mounting substantially centrally thereof, means releasably latching said parts together in predetermined relation at one end, respectively, thereof for concomitant movement to make and break the circuit, said control element being disposed between and operatively engaging said parts intermediate said one ends and said pivotal mounting and operable to separate said parts at said one ends thereof for automatic opening of the circuit, and a compensating element disposed between and operatively engaging said parts intermediate said pivotal mounting and said other ends, respectively, thereof and operable to separate said parts at said other ends thereof, for substantially preventing the flexing of said control element in response to energy variations to which said circuit breaker may be subjected whereby to substantially neutralize the effects of said energy variations on said control element for maintaining said predetermined latching relation substantially constant through a range of said energy variations.

12. In a circuit breaker provided with a flexible bimetallic current-responsive control element which is operable in response to abnormal current conditions to open the circuit, mechanism compensated for energy variations to which the breaker may be subjected comprising movable switch means formed by relatively movable elongated parts having a common pivotal mounting substantially centrally thereof, means releasably latching said parts together in predetermined relation at one end, respectively, thereof for concomitant movement to make and break the circuit, said control element being disposed between and operatively engaging said parts intermediate said one ends and said pivotal mounting and operable to separate said parts at said one ends thereof for automatic opening of the circuit, and a compensating element disposed between and operatively engaging said parts intermediate said pivotal mounting and said other ends, respectively, thereof and operable to separate said part at said other ends thereof, for substantially preventing the flexing of said control element in response to energy variations to which said circuit breaker may be subjected whereby to substantially neutralize the effects of said energy variations on said control element for maintaining said predetermined latching relation substantially constant through a range of said energy variations, one of said parts having a conducting member provided with a contact and in circuit with said control element.

13. In a circuit breaker having relatively movable contacts engageable with and disengageable from each other for making and breaking the circuit, movable switch means carrying one of said contacts and comprising first and second movable members, mechanism for actuating said switch means to make and break the circuit including actuating means provided on one of said members and latch means provided on the other of said members, said latch means being releasably engageable with said actuating means to latch said members together for concomitant movement thereof to open and close the breaker, and current-responsive control means operable in response to an abnormal current condition to effect relative movement of said members to disengage said actuating means and said latch means for automatic opening of the breaker, said control means being a flexible bimetallic current-carrying strip operatively engaging and disposed between said members and flexing in response to said abnormal current condition to move said members in opposite directions, respectively, said strip having laterally spaced portions through which the current flow is in the same direction for establishing electromagnetic fields of similar polarity, whereby when a current of predetermined strength flows in said strip, said portions thereof will be mutually repelled for moving said first and second members in opposite directions.

14. In a circuit breaker, relatively movable contacts engageable with and disengageable from each other for making and breaking the circuit, movable switch means carrying one of said contacts, mechanism for actuating said movable switch means to make and break the circuit, and inertia-responsive means operable to prevent operation of said mechanism when the breaker is subjected to shock, said means comprising a latch member in operative engagement with said mechanism and a catch normally disengaged from said member and operable to releasably interengage said latch member in response to shock for preventing movement of said mechanism, one of said members including portions flanking the other for response to shock impulses from opposite directions.

15. In a circuit breaker, relatively movable contacts engageable with and disengageable from each other for making and breaking the circuit, movable switch means carrying one of said contacts, mechanism for actuating said movable switch means to make and break the circuit, and inertia-responsive means operable to prevent operation of said mechanism when the breaker is subjected to shock, said means comprising a latch member in operative engagement with said mechanism and a catch normally disengaged from said member and operable to releasably interengage said latch member in response to shock for preventing movement of said mechanism, said catch being a resiliently mounted part, said latch member having a first predetermined portion interengageable by said part in the circuit making disposition of said mechanism and another predetermined portion interengageable by said part on the circuit breaking disposition of said mechanism.

16. In a circuit breaker, relatively movable contacts engageable with and disengageable from each other for making and breaking the circuit, movable switch means carrying one of said contacts, mechanism for actuating said movable switch means to make and break the circuit, and inertia-responsive means operable to prevent operation of said mechanism when the breaker is subjected to shock, said means comprising a latch piece in operative engagement with said mechanism, and mounted for reciprocation in response to operation of said mechanism, and a pivoted catch in straddling relation with and normally disengaged from said latch piece and operable to interengage the latter when the breaker is subjected to shock.

17. In a circuit breaker having relatively movable contacts engageable with and disengageable from each other for making and breaking the circuit, movable switch means carrying one of said contacts and comprising first and second movable members, mechanism for actuating said switch means to make and break the circuit including actuating means provided on one of said members and latch means provided on the other of said members, said latch means being releasably engageable with said actuating means to latch said members together for concomitant movement thereof to open and close the breaker, and current-responsive control means operatively engaging at least one of said members and operable in response to an abnormal current condition to effect relative movement of said members to disengage said actuating means and said latch means for automatic opening of the breaker, and means for adjusting said latch means relative to said actuating means for adjusting the engagement of said actuating and latch means for predetermining the current condition at which said control means will open the breaker, said latch means comprising a latching part engageable with said actuating means and mounted for axial movement and an operating part for effecting said axial movement.

18. In a circuit breaker having relatively movable contacts engageable with and disengageable from each other for making and breaking the circuit, movable switch means carrying one of said contacts and comprising first and second movable members, mechanism for actuating said switch means to make and break the circuit including actuating means provided on one of said members and latch means provided on the other of said members, said latch means being releasably engageable with said actuating means to latch said members together for concomitant movement thereof to open and close the breaker, and current-responsive control means operatively engaging at least one of said members and operable in response to an abnormal current condition to effect relative movement of said members to disengage said actuating means and said latch means for automatic opening of the breaker, and means for adjusting said latch means relative to said actuating means for adjusting the engagement of said actuating and latch means for determining the current condition at which said control means will open the breaker, said latch means comprising a rotary operating part carried by said other member and a latching part mounted for axial movement by said rotary part.

19. In a circuit breaker having relatively movable contacts engageable with and disengageable from each other for making and breaking the circuit, movable switch means carrying one of said contacts and comprising first and second movable members, mechanism for actuating said switch means to make and break the circuit including actuating means provided on one of said members and latch means provided on the other of said members, said latch means being releasably engageable with said actuating means to latch said members together for concomitant movement thereof to open and close the breaker, and current-responsive control means operable in response to an abnormal current condition to effect relative movement of said members to disengage said actuating means and said latch means for automatic opening of the breaker, said control means being a flexible bimetallic current-carrying strip disposed between said members and operatively engaging them and flexing in response to said abnormal current condition to move said members in opposite directions, respectively, said strip being provided with means for establishing electromagnetic fields about said strip in response to current flow therethrough, said field-producing means being relatively disposed for mutual interaction of their respective electro-magnetic fields whereby, when a current of predetermined strength flows in said strip, said strip will flex in response to said interaction of said electro-magnetic fields, said means being laterally spaced substantially parallel portions of said strip through which the current flow is in the same direction for establishing electromagnetic fields of similar polarity, respectively.

20. A circuit breaker including relatively movable contacts engageable with and disengageable from each other for opening and closing a circuit, movable switch means carrying one of said contacts, mechanism for actuating said movable switch means to open and close the circuit, and inertia-responsive means operable to prevent operation of said mechanism when the breaker is subjected to shock, said means including interengaging latching portions one of which is resiliently supported for movement into and out of engagement with the other in response to a mechanical impulse and following the mechanical impulse, respectively, when the impulse comes from one direction and further interengageable latching portions one of which is resiliently supported for movement into latching engagement with the other in response to a mechanical impulse from the opposite direction.

21. A circuit breaker including a pair of relatively movable contacts, operating mechanism to open and close the contacts, and current responsive latching means normally effective to retain the contacts closed and to release the contacts for opening, said latching means including a latch member carried on a pivot at a balance point between the ends thereof, a current responsive bimetal bearing against said member at one side of the pivot in the latch-releasing direction and acting increasingly in response to increasing values of current, and resilient means bearing against said member at the opposite side of the pivot and balancing the action of said current responsive bimetal in the absence of current.

22. A circuit breaker including a pair of relatively movable contacts, operating mechanism to open and close the contacts, and current responsive latching means normally effective to retain the contacts closed and to release the contacts for opening, said latching means including a latch member carried on a pivot at a balance point between the ends thereof, a current responsive bimetal bearing against said member at one side of the pivot in the latch-releasing direction and acting increasingly in response to increasing values of current, and a temperature compensating bimetal bearing against said member at the opposite side of the pivot and balancing the action of said current responsive bimetal in the absence of current, said temperature compensating bimetal acting increasingly against said member in response to ambient temperature increases.

23. A circuit breaker including a pair of relatively movable contacts, operating mechanism to open and close the contacts, and automatic release means for causing opening of the contacts, said release means including a pair of elongated approximately parallel members each carried on a pivot at a balance point between the ends thereof and carrying cooperating latching elements releasable by relative pivoting of said members in a predetermined direction to cause opening of the contacts, a current responsive bimetal acting between said members at one side of the pivots in said predetermined direction and acting increasingly in response to increasing values of current, and a resilient element acting between said members at the other side of their pivots and balancing the action of said current responsive bimetal in the absence of current.

24. A circuit breaker including a pair of relatively movable contacts, operating mechanism to open and close the contacts, and automatic release means for causing opening of the contacts, said release means including a pair of elongated approximately parallel members each carried on a pivot at a balance point between the ends thereof and carrying cooperating latching elements releasable by relative pivoting of said members in a predetermined direction to cause opening of the contacts, a current responsive bimetal acting between said members at one side of the pivots in said predetermined direction and acting increasingly in response to increasing values of current, and a temperature compensating bimetal acting between said members at the other side of their pivots and balancing the action of said current responsive bimetal in the absence of current, said temperature compensating bimetal acting increasingly against said member in response to ambient temperature increases.

25. A circuit breaker including a pair of relatively movable contacts, biasing means tending to keep the contacts apart, and actuating means operable to close the contacts, said actuating means including a pair of elongated generally parallel elements one of which carries one of said contacts, both said members having pivots at balance points between the ends thereof and said pivots being coaxial, said contact carrying elongated member also carrying an actuator and the other of said elongated members carrying a latch, a current responsive bimetal acting between said members at one side of the pivots thereof in the direction to cause said latch to pass out of engagement with said actuator and acting increasingly in that direction in response to increasing values of current when the circuit breaker is closed, and an ambient temperature compensating bimetal acting between said members at the other side said pivots and disposed to act increasingly in the opposite direction in response to increases in ambient temperature.

26. In a circuit breaker having relatively movable contacts engageable with and disengageable from each other for making and breaking the circuit, movable switch means carrying one of said contacts and mechanism, including actuating means, latch engaging means and latch means releasably engaged with said latch engaging means in predetermined relation, for actuating said movable switch means to make the circuit and retain the circuit made and said mechanism including spring means for operating said movable switch means to break the circuit upon release of said latch engaging means from said latch means; a current responsive flexible bimetallic control element operatively engaging said movable switch means and operable on said movable switch means upon the occurrence of an abnormal current condition to release the engagement of said latch engaging means from said latch means for opening the breaker, and means operatively engaging said movable switch means and operable on said switch means in opposition to said control element for substantially preventing the flexing of said control element in response to energy variations to which said circuit breaker may be subjected, whereby to substantially neutralize the effects of said energy variations on said control element for maintaining said predetermined latch engaging means and latch means relation substantially constant through a range of said energy variations, said energy variations being variations in mechanical energy, said movable switch means being mounted in substantially balanced disposition, said control element being disposed to operate on said movable switch means at one side of the balanced mounting thereof, and said preventing means being disposed to operate on said movable switch means at the other side of said balanced mounting with substantially the same degree of force as said control element in response to the variations in mechanical energy to which the circuit breaker is subjected.

27. In a circuit breaker having relatively movable contacts engageable with and disengageable from each other for making and breaking the circuit, movable switch means carrying one of said contacts and mechanism, including actuating means, latch engaging means and latch means releaseably engaged with said latch engaging means in predetermined relation, for actuating said movable switch means to make the circuit and said mechanism also including spring means acting on said movable switch means to break the circuit upon release of said latch means from said latch engaging means; a current-responsive flexible bimetallic control element operable on said movable switch means upon the occurrence of an abnormal current condition to release said latch engaging means from said latch means for opening the breaker, and means for compensating for flexing of said control element in response to ambient temperature variations, said latter means comprising a compensating thermal responsive element operable on said switch means in opposition to said control element for substantially preventing the flexing of said control element in response to ambient temperature variations to which said circuit breaker may be subjected, whereby to substantially neutralize the effects of said ambient temperature variations on said control element for maintaining said predetermined latch engaging and latch means relation substantially constant through a range of said ambient temperature variations, said movable switch means being mounted in substantially balanced disposition, said control element being disposed to flex against said movable switch means at one side of the balanced mounting thereof, and said compensating element being disposed to flex against said movable switch means at the other side of said balanced mounting with substantially the same degree of force as said control element in response to the variations in ambient temperature to which the circuit breaker is subjected.

References Cited in the file of this patent

UNITED STATES PATENTS

| Number | Name | Date |
|---|---|---|
| 1,886,477 | Getchell | Nov. 8, 1932 |
| 2,029,980 | Besag | Feb. 4, 1936 |
| 2,145,722 | Hall | Jan. 31, 1939 |
| 2,189,827 | Werner | Feb. 13, 1940 |
| 2,190,517 | Jennings | Feb. 13, 1940 |
| 2,199,622 | Dorfman | May 7, 1940 |
| 2,203,462 | Frank | June 4, 1940 |
| 2,209,353 | Sachs | July 30, 1940 |
| 2,210,870 | Platz | Aug. 6, 1940 |
| 2,224,990 | Sachs | Dec. 17, 1940 |
| 2,284,825 | Jennings et al. | June 2, 1942 |
| 2,318,279 | Aschwanden | May 4, 1943 |
| 2,320,356 | Frank et al. | June 1, 1943 |
| 2,325,650 | Baxter | Aug. 3, 1943 |
| 2,338,474 | Wilson | Jan. 4, 1944 |
| 2,344,946 | Landon | Mar. 28, 1944 |
| 2,367,382 | Taylor | Jan. 16, 1945 |
| 2,385,293 | Logan | Sept. 18, 1945 |
| 2,406,378 | Immel | Aug. 27, 1946 |
| 2,411,351 | Armstrong | Nov. 19, 1946 |
| 2,422,799 | Pokorny | June 24, 1947 |
| 2,426,301 | Ellis et al. | Aug. 26, 1947 |
| 2,438,373 | Oppel | Mar. 23, 1948 |
| 2,455,753 | Getchell | Dec. 7, 1948 |
| 2,495,633 | Hayward | Jan. 24, 1950 |
| 2,506,187 | Yarrick | May 2, 1950 |
| 2,534,906 | Grissinger et al. | Dec. 19, 1950 |
| 2,534,938 | Woodward | Dec. 19, 1950 |
| 2,640,127 | Rowe et al. | May 26, 1953 |
| 2,653,202 | Cole | Sept. 22, 1953 |
| 2,657,292 | Page | Oct. 27, 1953 |
| 2,661,414 | Casey | Dec. 1, 1953 |
| 2,667,548 | Page | Jan. 26, 1954 |

FOREIGN PATENTS

| Number | Country | Date |
|---|---|---|
| 484,769 | Great Britain | May 10, 1938 |
| 502,052 | Great Britain | Mar. 10, 1939 |
| 792,513 | France | Oct. 21, 1935 |